United States Patent
Sweeney (10) Patent No.: US 10,541,874 B2
(45) Date of Patent: Jan. 21, 2020

(54) METHOD AND SYSTEM FOR SPANNING TREE PROTOCOL ROLE PROTECTION

(71) Applicant: Arista Networks, Inc., Santa Clara, CA (US)

(72) Inventor: Adam James Sweeney, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/052,778

(22) Filed: Aug. 2, 2018

(65) Prior Publication Data

US 2019/0109764 A1  Apr. 11, 2019

Related U.S. Application Data

(60) Provisional application No. 62/569,225, filed on Oct. 6, 2017.

(51) Int. Cl.
*H04L 12/24* (2006.01)
*H04L 12/46* (2006.01)

(52) U.S. Cl.
CPC ........ *H04L 41/0893* (2013.01); *H04L 12/462* (2013.01); *H04L 41/12* (2013.01)

(58) Field of Classification Search
CPC ............... H04L 41/0893; H04L 12/462; H04L 12/4633; H04L 41/12
See application file for complete search history.

(56) References Cited

U.S. PATENT DOCUMENTS 7,076,594 B2   7/2006  Benedetto et al.
2007/0159988 A1*  7/2007  Khan ...................... H04L 12/28

\* cited by examiner

*Primary Examiner* — Ronald B Abelson
(74) *Attorney, Agent, or Firm* — Chamberlain, Hrdlicka, White, Williams & Aughtry (57) ABSTRACT

In general, embodiments of the invention relate to configuring network elements to prevent the formation of logical loops in a network. More specifically, embodiments of the invention provide a mechanism to associate a port policy with all or a portion of the ports of a network element and to enforce certain types of behavior.

26 Claims, 6 Drawing Sheets

METHOD AND SYSTEM FOR SPANNING TREE PROTOCOL ROLE PROTECTION

CROSS-REFERENCE TO RELATED APPLICATIONS

This application claims priority to U.S. Provisional Patent Application No. 62/569,225 filed Oct. 6, 2017, the entire disclosure of which is hereby expressly incorporated by reference herein

BACKGROUND

A Spanning tree protocol (STP) is a network protocol that is used to build a logical loop-free network topology. In certain scenarios, there may be errors or issues within the network that cause STP to not work properly. In such cases, loops may develop within the network topology.

SUMMARY

In general, in one aspect, the invention relates to a method for managing ports on a network element. The method includes receiving a notification of a port transition for a port of a plurality of ports on the network element, wherein the port is associated with a port role and a port state determined using a spanning tree protocol engine executing on the network element, making a determination that the port transition conflicts with a port policy of the port, in response to the determination: disabling the port, re-enabling the port in response to an enabling event, and after re-enabling the port, managing the port using the spanning tree protocol engine.

In general, in one aspect, the invention relates to a network element. The network element includes a plurality of ports, and a spanning tree protocol engine and a policy engine. The spanning tree protocol engine is programmed to: prior to disabling a port, manage, using a spanning tree protocol, a port role and a port state for the port of the plurality of ports. The policy engine is configured to receive a notification of port transition for the port, make a determination that the port transition conflicts with a port policy of the port, in response to the determination: initiate disabling of the port, and initiate enabling of the port after an enabling event, wherein the port is managed using the spanning tree protocol engine after the enabling event.

In general, in one aspect, the invention relates to a non-transitory computer readable medium comprising instructions, which when executed by processor perform a method. The method includes receiving a notification of a port transition for a port of a plurality of ports on a network element, wherein the port is associated with a port role and a port state determined using a spanning tree protocol engine executing on the network element, making a determination that the port transition conflicts with a port policy of the port, in response to the determination: disabling the port, re-enabling the port in response to an enabling event, and after re-enabling the port, managing the port using the spanning tree protocol engine.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to configuring network elements to prevent the formation of logical loops in a network. More specifically, embodiments of the invention provide a mechanism to associate a port policy with all or a portion of the ports of a network element and to enforce certain types of behavior such as, for example, permitting or not permitting a state of a port of the network element to transition to a forwarding state. In scenarios in which transitioning of the state to a forwarding state is not permitted, the port is disabled (i.e., packets may be not be sent or received on this port). Following the disabling of the port, the port may be re-enabled in response to an enabling event.

Figure 1:
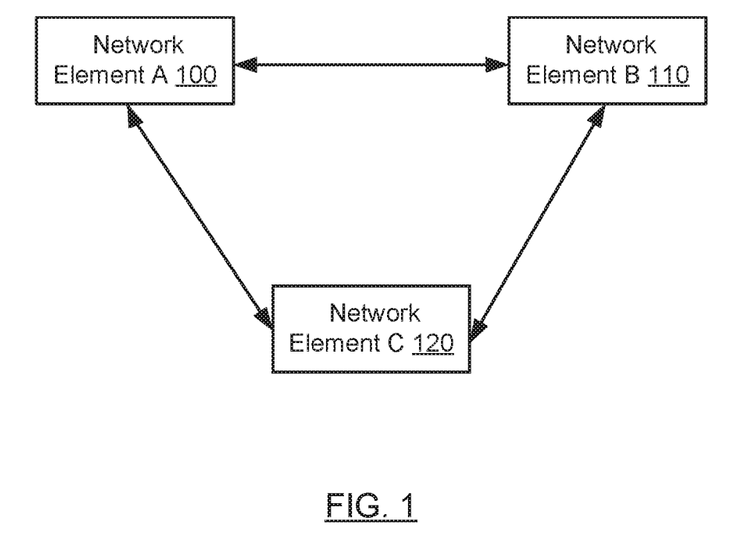
FIG. 1 shows a diagram of a system in accordance with one or more embodiments of the invention.

FIG. 1 shows a system in accordance with one or more embodiments of the invention. The system includes network elements (100, 110, 120) that are physically connected to each other to form a network. Each of the network elements may be connected to one or more hosts (described below) (not shown). A network element may generate a packet and/or receive a packet from one network element and transmit the packet to another network element. A given packet may be processed and/or forwarded by multiple network elements until it reaches the destination network element. Additional details regarding the operation of the network elements are described with respect to FIG. 2.

In one or more embodiments of the invention, a logical network topology is used to enable packets to be transmitted between network elements. The logical network topology must be loop-free (i.e., not include any loops). If the logical network topology includes loops, the packets may be not able to reach their intended destination network element. For example, a packet may become trapped within a loop of the logical network topology.

In one or more embodiments of the invention, a loop-free logical network topology may be generated, in part, by using a spanning tree protocol (STP) (or a rapid STP) (see e.g., IEEE 802.1d-2004). More specifically, each of the network elements may implement the STP. The STP may include a mechanism for the network elements in the network to be organized into a loop-free logical network. Accordingly, while the network elements may be physically connected in a topology that includes loops (see e.g., FIG. 1), the STP may be used to generate a logical loop-free topology.

One skilled in the art will recognize that the architecture of the system is not limited to the components shown in FIG. 1.

Figure 2:
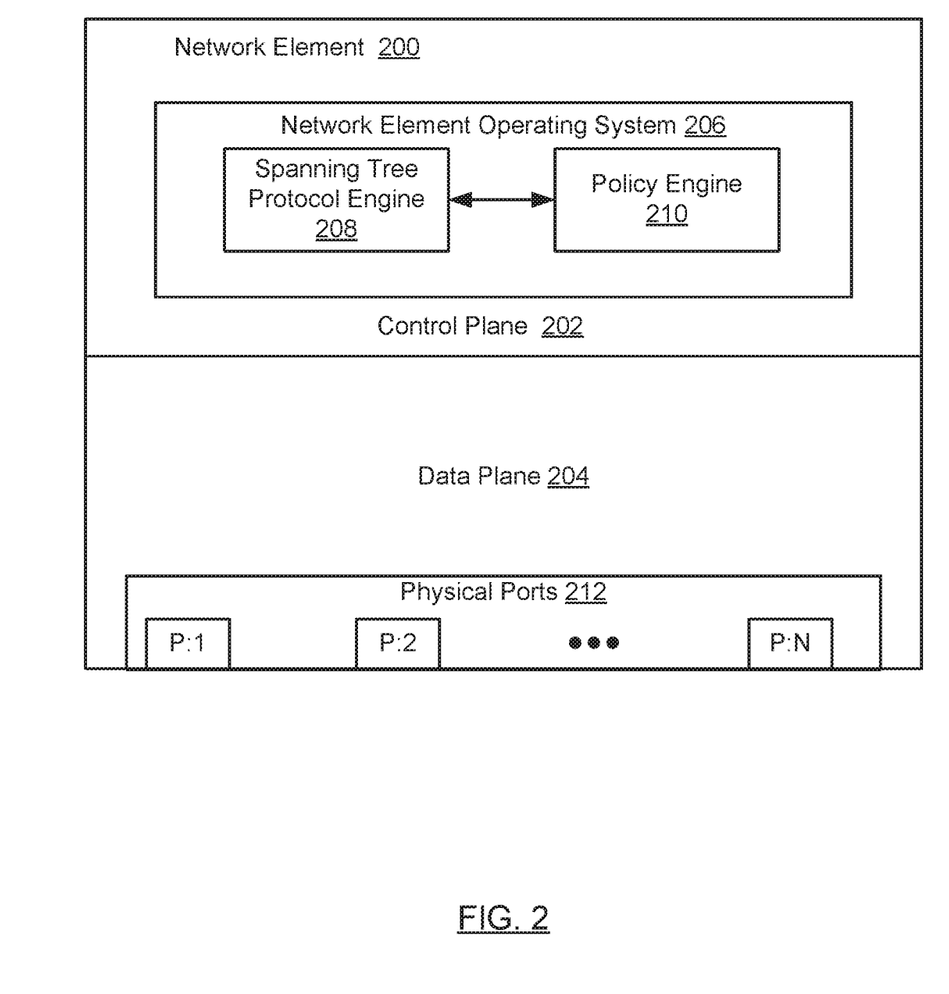
FIG. 2 shows a diagram of a network element in accordance with one or more embodiments of the invention.

FIG. 2 shows a network element in accordance with one or more embodiments of the invention. In one or more embodiments of the invention, a network element (200) may be a physical device that includes persistent storage (not shown), memory (e.g., random access memory (RAM), shared memory) (not shown), one or more computer processor(s) (e.g., integrated circuits) (including a switch chip or network processor) (not shown), and two or more physical network interfaces or ports (see e.g., 212). The switch chip or network processor may be hardware that determines out of which egress port of the network element (200) to forward media access control (MAC) frames. The switch chip or network processor may include egress and ingress ports that may connect to the physical network interfaces or ports of the network element (200). Further, each physical network interface or port may or may not be connected to another component (e.g., a host (not shown), another network element, etc.). A network element (200) may be configured to receive network packets via the network interfaces or ports, and determine whether to: (i) drop the network packet; (ii) process the network packet in accordance with one or more embodiments of the invention; and/or (iii) send the network packet, based on the processing, out another network interface or port on the network element (200).

In one or more embodiments of the invention, the network element (200) makes the determination of whether to drop a network packet, and/or send a network packet to another component based, in part, on whether the network element (200) is a L2 switch or a L3 switch (also referred to as a multilayer switch), which may perform at least some of the functions of a router. If the network element (200) is operating as a L2 switch, the network element (200) uses the destination MAC address along with a forwarding table or policy to determine out of which network interface or port to send the network packet. If the network element (200) is operating as a L3 switch, the network element (200) uses the destination Internet Protocol (IP) address along with a routing table or policy to determine out of which network interface or port to send the network packet and may write the MAC address of the next hop (or component) to receive the network packet in place of its own MAC address (which the last hop or component to send the network packet wrote) in the L2 information encapsulating the network packet. If the network element (200) is a multilayer switch, the network element (200) includes functionally to process network packets using both MAC addresses and IP addresses.

In one or more embodiments of the invention, the persistent storage of a network element (200) may include any type of non-transitory computer readable medium that includes instructions, which, when executed by the one or more computer processor(s), enable the network element (200) to perform any of the functionalities described above and shown in FIGS. 3 and 4. Moreover, examples of a network element (200) include, but are not limited to, a switch, a router, and a multilayer switch. A network element (200) is not limited to the aforementioned specific examples.

In one or more embodiments of the invention, the network element (200) may include a data plane (204) and a control plane (202). The data plane (204) may include the switch chip or network processor (not shown) and the physical ports (or interfaces). The control plane (202) includes a network element operating system (OS) (206), which is used to manage the behavior of the network element.

The network element OS (206) may execute on a processor in the control plane (206), e.g., a central processing unit (not shown), that may interface with volatile and/or non-volatile memory such as dynamic-random-access memory, flash storage, a hard disk drive, etc. Alternatively, the network element OS (206) may execute on a virtual machine, hosted in the control plane. In one or more embodiments of the invention, the network element OS (206) includes a spanning tree protocol engine (208) and a policy engine (210). Each of the aforementioned components of the OS (206) is described below.

In one or more embodiments of the invention, the spanning tree protocol engine (208) executes the STP. Executing the STP may cause a port role and a port state to be assigned to each enabled port on the network element. The spanning tree protocol engine may also include functionality to change the port role assigned to a given port and/or change the port state of a given port.

In STP, a port of a network element may be assigned to one of the following five roles: root role, designated role, alternative role, backup role and disabled role. Briefly, a root port (i.e., a port with a role of root) is a forwarding port that is the best port to convey Bridge Protocol Data Units (BPDUs) from a non-root network element to the root network element. A designated port (i.e., a port with a role of designated) is a forwarding port that forwards BPDU packets (described below) away from the root network element to other network elements in the network. An alternative port (i.e., a port with a role of alternative) provides an alternative path to the root network element. A backup port (i.e., a port with a role of backup) is a port that is directly connected to another port on the same network element. A disabled port (i.e., a port with a role of disabled) is a port that may be manually disabled by a network administrator, Each port is assigned a port role by exchange of STP packets referred to as BPDUs.

In one or more embodiments of the invention, the STP may have three primary port states: discarding, learning, and forwarding. In a discarding state, packets are received by the port but are not forwarded. In a learning state, the port is populating its media access control (MAC) address table, without forwarding packets, in preparation for transitioning to the forwarding state. Finally, ports in the forwarding state are fully operational (i.e., the port can receive and forward packets).

In one or more embodiments of the invention, the STP may generate a logical topology that includes one or more loops. The loops may be caused by one or more assumptions relating to the physical connections between multiple network elements that are not actually present in the physical connections between the network elements. An assumption may be, for example, that all of the connections between network elements are bidirectional while, in reality, the physical connections between network elements include one or more unidirectional connections (See e.g., FIG. 5). The differences between these assumptions and the actual physical connections may not be detectable by the STP and result in loops or other defects in the logical topology generated by the STP.

In one or more embodiments of the invention, the policy engine (210) includes functionality to prevent and/or remediate the formation of loops by: (i) associating a port policy to each of the ports, (ii) monitoring (directly or indirectly, via the STP engine) the role and state information for each of the ports, and (iii) applying, using the information obtained from the monitoring, the port policy. In the event that a port policy is violated by a given port, the policy engine may initiate the disabling of the port and, optionally, to initiate the generation of a notification of to a user (e.g., a network administrator) that the port has been disabled.

The policy engine may also include functionality to initiate the re-enabling of the port after an enabling event has occurred. The enabling event may be the expiration of a timeout period and/or receiving a notification that a user command to re-enable the port has been issued. The policy engine may also include functionality to generate a report of which ports have been disable and what specific port policies have been violated on which ports.

One skilled in the art will recognize that the architecture of a network element is not limited to the components shown in FIG. 2. For example, the network element may include processors or memory not shown in FIG. 2. Further, a network element in accordance with an embodiment of the invention may include functionality modules not shown) that provide routing functionality.

Figure 3:
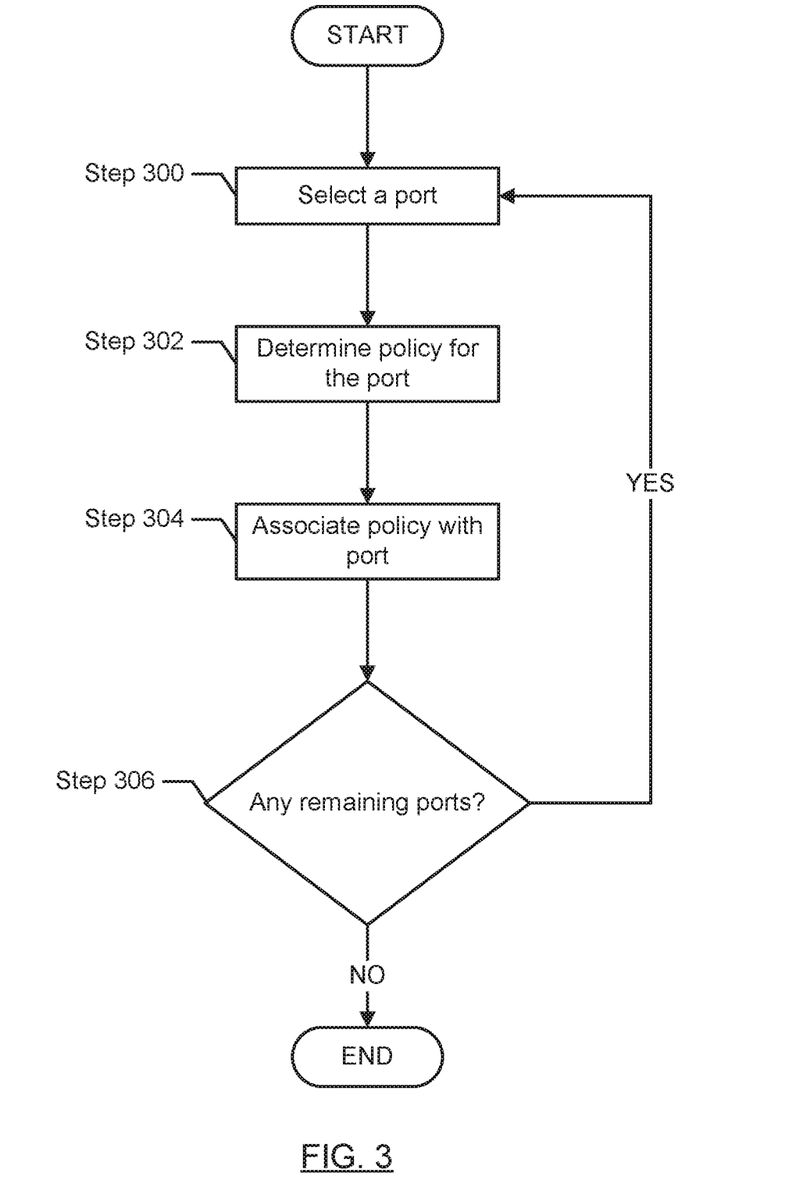
FIG. 3 shows a flowchart of a method for configuring a port policy for each port of the network device in accordance with one or more embodiments of the invention.
Figure 4:
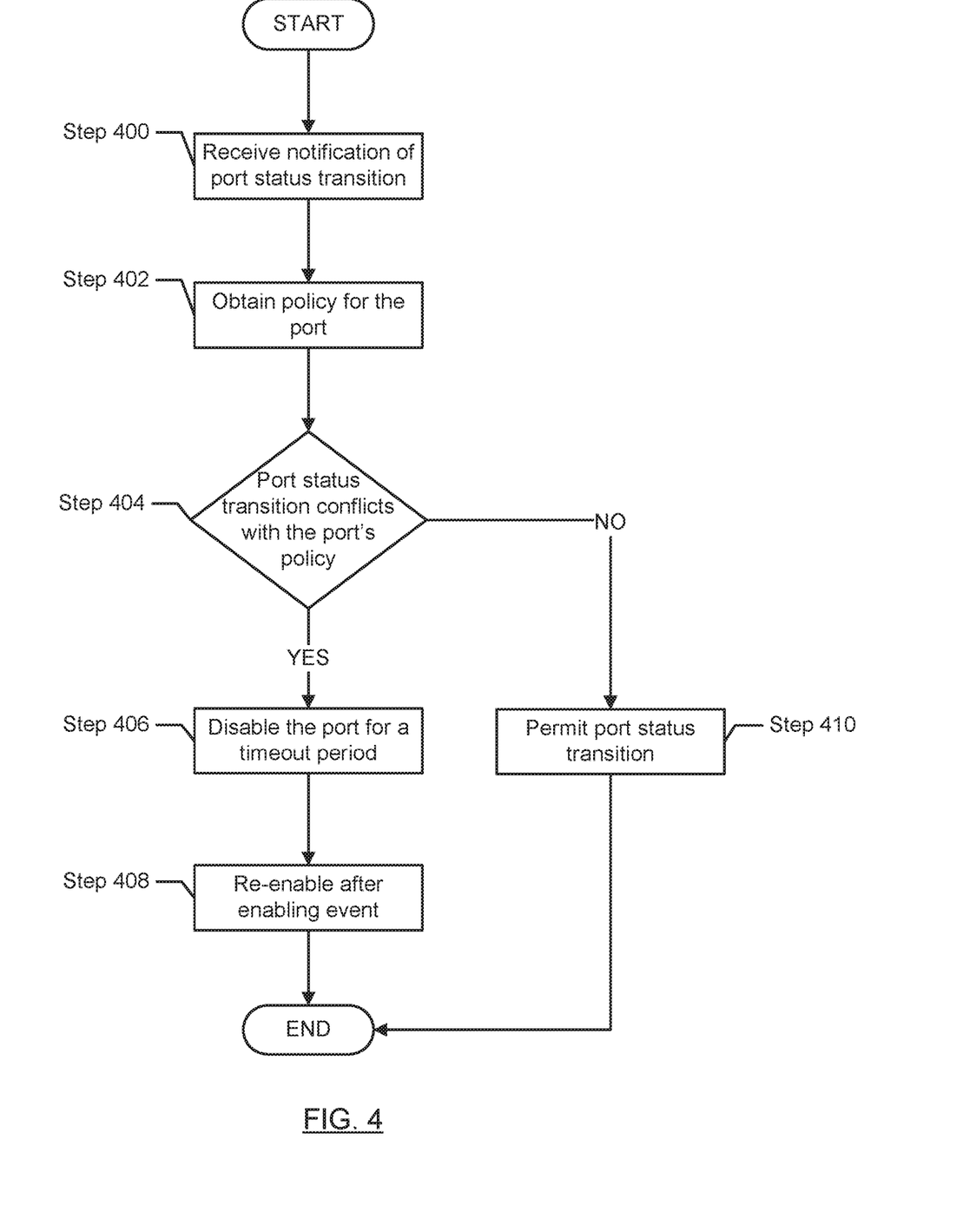
FIG. 4 shows a flowchart of a method for processing port transition in accordance with one or more embodiments of the invention

FIGS. 3 and 4 show flowcharts in accordance with one or more embodiments of the invention. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 3 shows a flowchart of a method of determining port policy for each port of the network device in accordance with one or more embodiments of the invention. The method shown in FIG. 3 may be performed on a per network element basis. The method of FIG. 3 may be performed by, for example, a network element operating system or another component of a network element or network component of a network.

In step 300, a port of the network element is selected. The port may be selected randomly or according to a specific set of factors. For example, the port of the network element may be selected using a port identifier. The aforementioned examples are not intended to limit the scope of the invention. The port may be selected by other methods without departing from the invention.

In step 302, the policy for the selected port is determined. The policy may specify a port role and/or whether a port in the given role may transition to a given port state. The following are non-limiting examples of port policies: (i) a port with a role of designated is not permitted to transition to a forwarding state, and (ii) a port with a role of root is not permitted to transition to a forwarding state.

In step 304, the port policy is associated with the port. In one or more embodiments of the invention, each port may be associated with a different port policy. Associating the port policy with the port may include storing the port policy and a port identifier in a data structure within the memory on the network device.

In step 306, a determination is made regarding whether any port of the network devices is remaining. A remaining port is a port of the network element that has not been previously selected by the selection process of step 300. If one or more ports are remaining ports, the process proceeds to step 300; otherwise, the process ends. In other words, steps 300, 302, and 304 may be repeated for each port of the network device. While illustrated as a sequential process in FIG. 3, steps 300, 302, and 304 may be performed in parallel for each of the ports, or a portions of the ports, of the network device without departing from the invention.

In one embodiment of the invention, as an alternative to setting a port policy on a per-port basis in accordance with FIG. 3, a global port policy may be obtained and then associated with each of the ports on the network element. In such a scenario, step 300 may not be performed.

In one embodiment of the invention, a port policy may be associated with a port using a command line interface (CLI) command, which specifies the port and the associated port policy.

FIG. 4 shows a flowchart of a method of processing port transitions in accordance with one or more embodiments of the invention. The method of FIG. 4 may be performed by, for example, a network element operating system or another component of a network element or network component of a network In step 400, a notification of a port transition is received. In one embodiment of the port transition may be a port state transition or a port role transition. A port state transition, in one embodiment of the invention, may occur when there is an attempt to transition the port to a new state. For example, a port state transition may occur when there is an attempt to transition the port state from a discarding state to a forwarding state. The example is not intended to limit the scope of the invention. A port role transition, in one embodiment of the invention, may occur when there is an attempt to transition the port to a new role. For example, a port role transition may occur when there is an attempt to transition the port from a root role to a designated role. The example is not intended to limit the scope of the invention.

The notification may be received from the STP engine and/or from another process executing on the network element having the port. In one or more embodiments of the invention, the notification may only be issued when the port transition is a transition from a non-forwarding state (e.g., a discarding state) to a forwarding state.

In step 402, the port policy for the port is obtained, for example, using a port ID of the port of step 400.

In step 404, a determination is made regarding whether the port transition conflicts with the obtained port policy. For example, if the port is a root port and the port policy specifies that forwarding is not permitted for root ports, then the port transition to the forwarding state is not permitted (i.e., the attempted port transition conflicts with the port policy). The method may proceed to step 106 if the determination indicates that the port transition conflicts with the obtained port policy; otherwise, the process proceeds to step 410.

In step 406, the port is disabled. More specifically, the policy engine initiates the disabling of the port. Once disabled, the port is unable to receive and/or send network packets. In addition, disabling the port may trigger the link state of a connected port (i.e., a port on another network element that is directly to connected to the port) to be reset. The port may be disabled until an enabling event occurs. Non-limiting examples of an enabling event include waiting for a period of time (i.e., a timeout period) or the port may be disable until a user command is received. The duration of the timeout period may vary based on the implementation of the invention.

In one or more embodiments of the invention, the spanning tree protocol engine does not take the disabled port into account when performing the STP while the port is disabled.

In step 408, the port is re-enabled. More specifically, upon receipt of an enabling event, the network element (or a component therein) may initiate the re-enablement of the port. In one or more embodiments of the invention, the spanning tree protocol engine takes the re-enabled port into account when performing the STP after the port has been re-enabled. Said another way, after the port is re-enabled, it is managed by the STP engine for purposes of STP. For example, after the port is re-enable, the STP engine, in accordance with STP, assigns the port a role and a port state.

Returning to Step 404, the policy engine issues a notification to the STP engine to permit the port transition.

Figure 5:
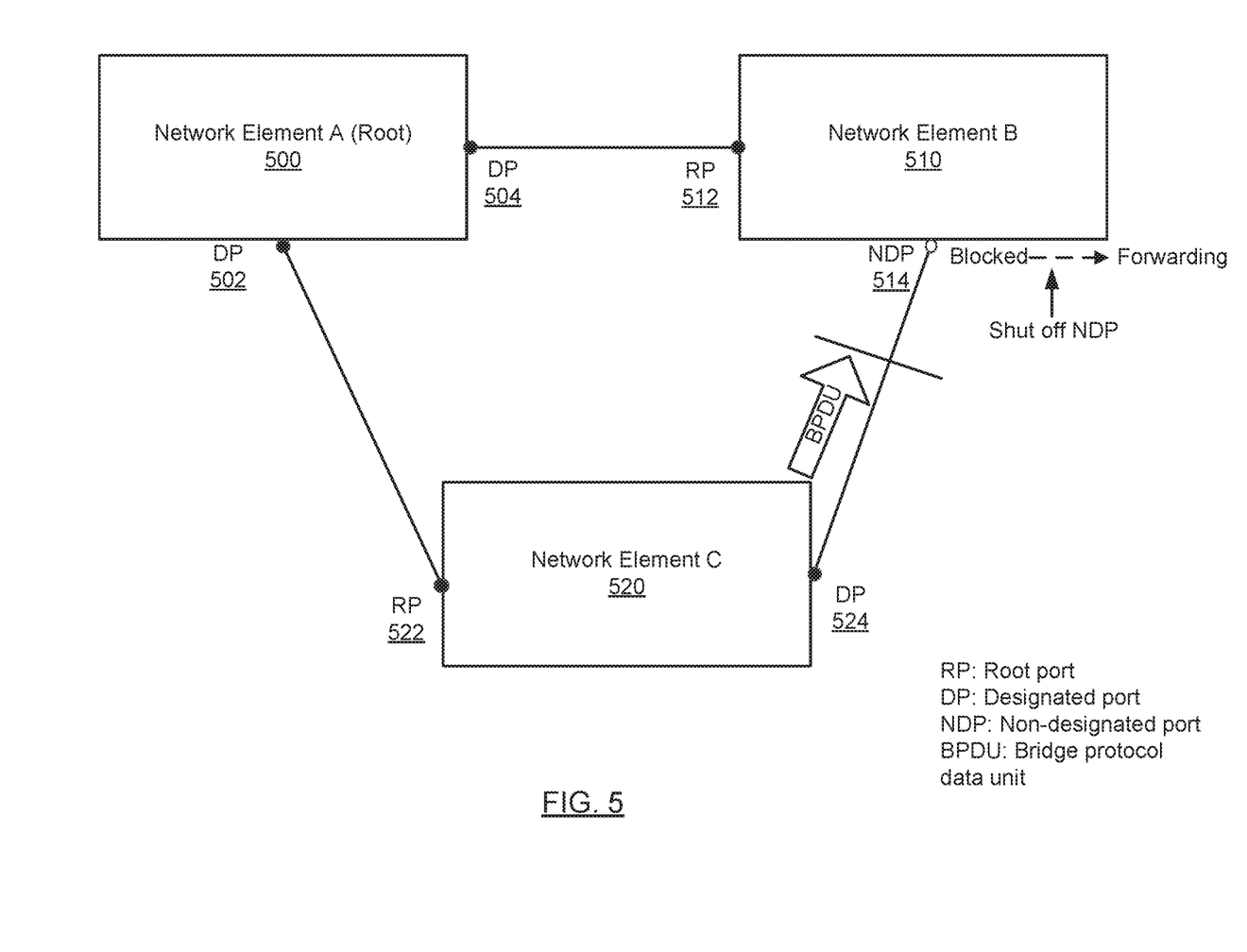
FIG. 5 shows an example in accordance with one or more embodiments of the invention.

FIG. 5 shows an example in accordance with one or more embodiments of the invention. The example is not intended to limit the scope of the invention.

A tree topology of the network shown in FIG. 5 is formed by implementing STP. In this example, Network element A (500) is a root of the tree topology, with two ports (502, 504) as designated ports (DP). Network elements B and C are connected with the root (network element A) via root ports (RP) (512, 522). In this example, because network element C has a lower ID (not shown) than network element B, a port (524) of network element C is a designated port and a port (514) of network element B is a non-designated port that is in a discarding state. The root ports and designated ports go into forwarding state.

Network element C sends BPDUs advertising its superiority over network element B. The non-designated port (514) of network element B (510) is maintained in a discarding state while network element B continues to receive the BPDUs on the non-designated port (514).

The non-designated port (514) of network element B (514) develops a connectivity problem that results in the non-designated port (514) failing to receive BPDUs. The connectivity problem may arise due to, for example, a faulty receiver or the non-designated port (514) or a faulty transmitter on the non-designated port (524) of network element C (520). After a predetermined period of time (e.g., 20 seconds), the non-designated port (514) of network element B (510) attempts to transition into a forwarding state by virtue of the STP. However, transitioning to the forwarding state would form a loop in the network.

In one or more embodiments of the invention, the port (514) is associated with a port policy that prevents it from forwarding by the policy engine. In the event that it tries to make the transition, port (514) is disabled for a timeout period because the state transition conflicts with its port policy, e.g., FIG. 4, step 406. After the timeout, the port is re-enabled, e.g., FIG. 4, step 408, and is then processed by the spanning tree protocol engine in accordance with STP.

In one or more embodiments of the invention, the network element is able force a hardware state reset of the disabled port by disabling the port when a non-permitted port transition is attempted. The forced hardware state reset of the port may trigger a reset on the hardware state of a port on another network element to which the port is connected. As a result of the forced hardware reset, the network element may have a higher likelihood to identify and correct the error that originally triggered the attempted port transition.

Figure 6:
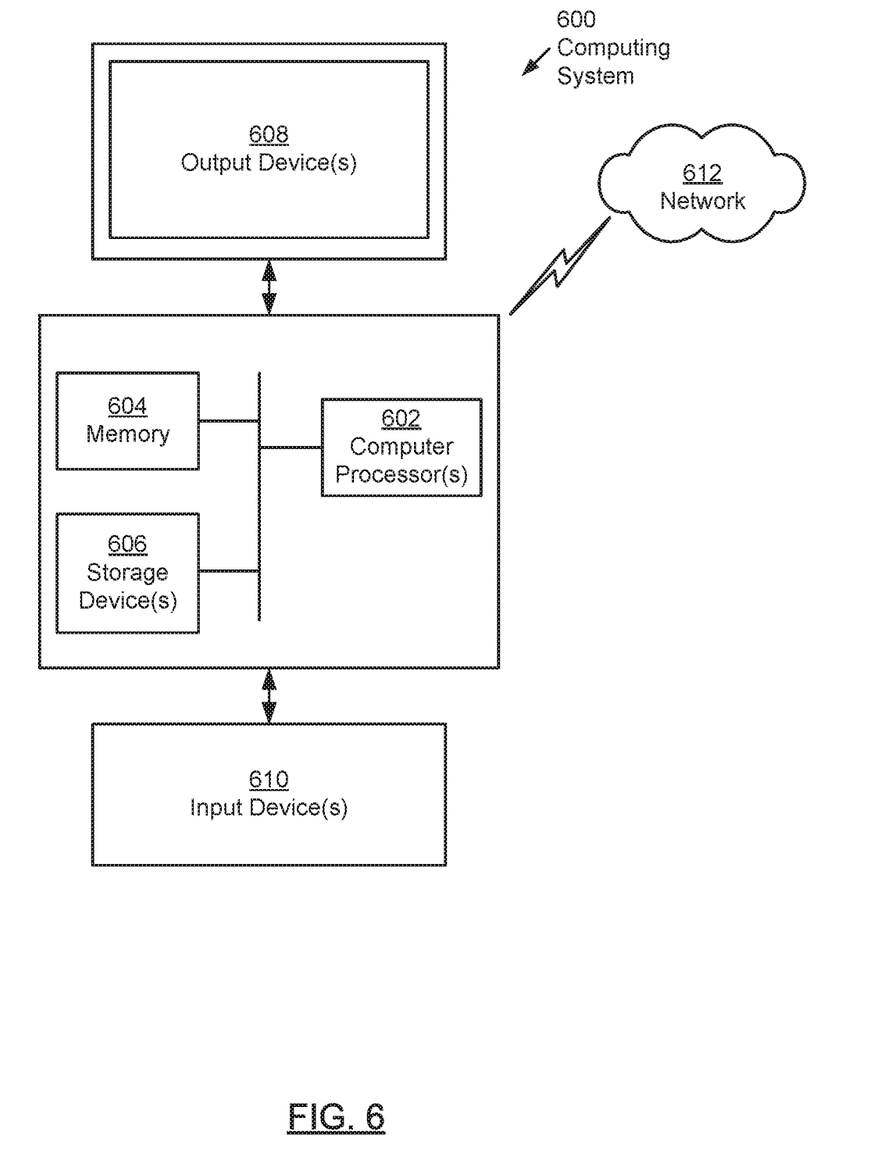
FIG. 6 shows a computing system in accordance with one or more embodiments of the invention.

Embodiments of the host may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (614). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing ports on a network element, comprising:
   receiving a notification of a port transition for a port of a plurality of ports on the network element, wherein the port is associated with a port role and a port state determined using a spanning tree protocol engine executing on the network element;
   making a determination that the port transition conflicts with a port policy of the port;
   in response to the determination:
      disabling the port;
      re-enabling the port in response to an enabling event; and
      after re-enabling the port, managing the port using the spanning tree protocol engine.

2. The method of claim 1, wherein the port role is at least one of root, designated, alternative, backup or disabled.

3. The method of claim 1, wherein the port transition comprises a transition of the port from a non-forwarding state to a forwarding state.

4. The method of claim 3, wherein the non-forwarding port state is at least one of discarding or learning.

5. The method of claim 1, wherein the enabling event comprises a notification that a timeout period has expired.

6. The method of claim 1, wherein the enabling event comprises a user command received by the network element.

7. The method of claim 1, wherein the port policy for the port specifies at least one port state that is not permitted for the port.

8. The method of claim 1, wherein the port policy for the port specifies at least one port role that is not permitted for the port.

9. The method of claim 1, wherein the port transition includes at least one selected from a group consisting of a port state transition and port role transition.

10. A network element, comprising:
    a plurality of ports; and
    a spanning tree protocol engine and a policy engine;
    wherein the spanning tree protocol engine is programmed to:
       prior to disabling a port, manage, using a spanning tree protocol, a port role and a port state for the port of the plurality of ports; and
    wherein the policy engine is configured to:
       receive a notification of port transition for the port;
       make a determination that the port transition conflicts with a port policy of the port;
       in response to the determination:
          initiate disabling of the port; and
          initiate enabling of the port after an enabling event, wherein the port is managed using the spanning tree protocol engine after the enabling event.

11. The network element of claim 10, wherein the port role is at least one of root, designated, alternative, backup, or disabled.

12. The network element of claim 10, wherein the port transition comprises a transition for the port from a non-forwarding state to a forwarding state.

13. The network element of claim 12, wherein the non-forwarding port state at least one of discarding or learning.

14. The network element of claim 10, wherein the enabling event comprises a notification that a timeout period has expired.

15. The network element of claim 10, wherein the enabling event comprises a user command received by the network element.

16. The network element of claim 10, wherein the port policy for the port specifies at least one port state that is not permitted for the port.

17. The network element of claim 10, wherein the port policy for the port specifies at least one port role that is not permitted for the port.

18. The network element of claim 10, wherein the port transition includes at least one selected from a group consisting of a port state transition and port role transition.

19. A non-transitory computer readable medium comprising instructions, which when executed by processor perform a method, the method comprising:
    receiving a notification of a port transition for a port of a plurality of ports on a network element, wherein the port is associated with a port role and a port state determined using a spanning tree protocol engine executing on the network element;
    making a determination that the port transition conflicts with a port policy of the port;
    in response to the determination:
       disabling the port;
       re-enabling the port in response to an enabling event; and
       after re-enabling the port, managing the port using the spanning tree protocol engine.

20. The non-transitory computer readable medium of claim 19, wherein the port role is at least one of root, designated, alternative, backup or disabled.

21. The non-transitory computer readable medium of claim 19, wherein the port transition comprises a transition from a non-forwarding state to a forwarding state.

22. The non-transitory computer readable medium of claim 21, wherein the non-forwarding port state is at least one of discarding or learning.

23. The non-transitory computer readable medium of claim 19, wherein the enabling event comprises at least one selected from a group consisting of a notification that a timeout period has expired and a user command received by the network element.

24. The non-transitory computer readable medium of claim 19, wherein the port policy for the port specifies at least one port state that is not permitted for the port.

25. The non-transitory computer readable medium of claim 19, wherein the port policy for the port specifies at least one port role that is not permitted for the port.

26. The non-transitory computer readable medium of claim 19, wherein the port transition includes at least one selected from a group consisting of a port state transition and port role transition.

* * * * *